Sept. 22, 1931.                 J. BETHENOD                     1,824,591
                                 AMPLIFIER
                             Filed April 27, 1925
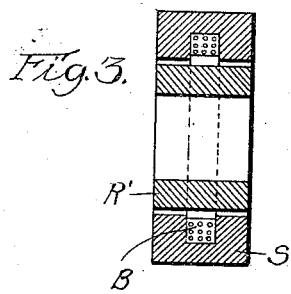
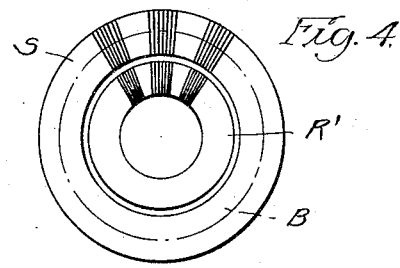
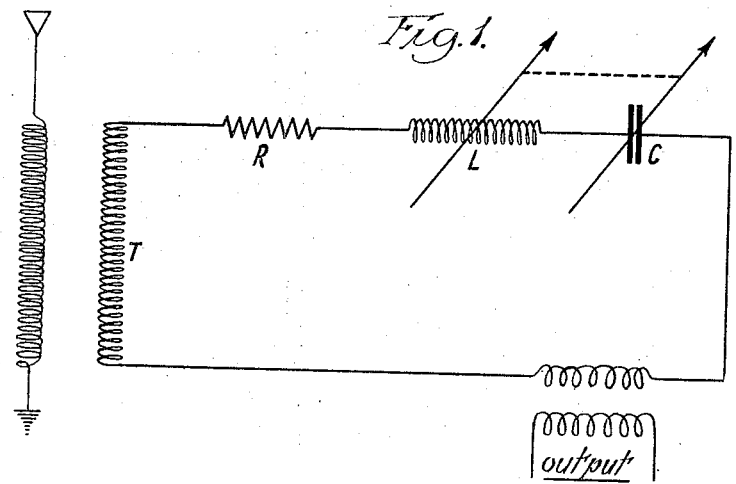
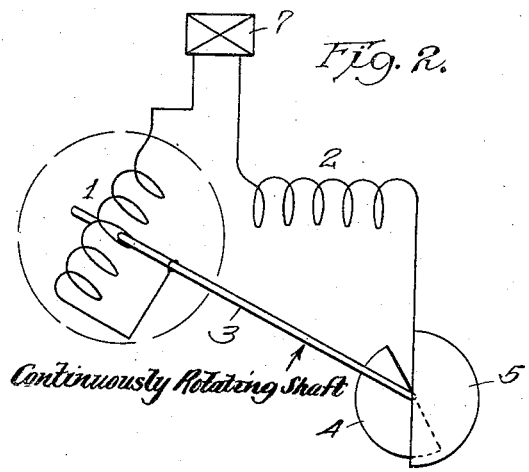
INVENTOR
JOSEPH BETHENOD
BY
ATTORNEY Patented Sept. 22, 1931

1,824,591

UNITED STATES PATENT OFFICE

JOSEPH BETHENOD, OF PARIS, FRANCE

AMPLIFIER

Application filed April 27, 1925, Serial No. 25,977, and in France May 26, 1924.

The present invention has as its object a new method of amplifying alternating currents without the use of triode tubes or similar devices. Indeed, the present method is based upon the following principles:

Let us take an oscillating circuit comprising a condenser of capacitance $C$, and an inductance coil having a coefficient of self-induction $L$, these quantities being boh variable with the time in conformity with definite laws; if $R$ is the total ohmic resistance supposed to be sensibly constant, the charge $q$ of the condenser undre free working conditions satisfies at any given instant the following equation:

$$\frac{q}{C} + \left(R + \frac{dL}{dt}\right)\frac{dq}{dt} + L + \frac{d^2q}{dt^2} = 0 \quad (1)$$

The derivation of Equation 1 is as follows: In an electric circuit comprising a capacity, a resistance, and self inductance, there is;

$$\frac{q}{c} + Ri + n\frac{d\phi}{dt} = 0 \quad (a)$$

where $\phi$ is the flux cutting the self inductance coil and $n$ the number of turns in the latter. Also, $$n\phi = Li$$

now assuming that the coefficient $L$ varies periodically with the time, there is:

$$n\frac{d\phi}{dt} = L\frac{di}{dt} = i\frac{dL}{dt}$$

and substituting in Equation $(a)$ $$\frac{q}{c} + Ri + L\frac{di}{dt} + i\frac{dL}{dt} = 0$$

$$i = \frac{dq}{dt}$$

then $$\frac{q}{c} + R\frac{dq}{dt} + L\frac{d^2q}{dt^2} + \frac{dq}{dt}\cdot\frac{dL}{dt} = 0$$

and $$\frac{q}{c} + \left(R + \frac{dL}{dt}\right)\frac{dq}{dt} + L\frac{d^2q}{dt^2} = 0$$

Let us now assume that the laws of variation of $C$ and of $L$ are inverse, in other words, that we may write:

$$CL = C_0 L_0 \quad (2)$$

quantities $L_0$ and $C_0$ being constants. Equation (1) then becomes:

$$q + C_0 \times \frac{L_0\left(R + \frac{dL}{dt}\right)}{L} \times \frac{dq}{dt} + C_0 L_0 \frac{d^2q}{dt^2} = 0 \quad (3)$$

In this shape it can immediately be found that conditions are the same as if the oscillation circuit possessed a capacitance $C_0$ and an an inductance $L_0$ that are constant, and an apparent resistance $$\rho = \frac{L_0\left(R + \frac{dL}{dt}\right)}{L} \quad (4)$$

variable with the time.

Let us then assume that the coefficient $L$ varies periodically in accordance with a frequency $$\frac{\omega}{2\pi} \quad (5)$$

appreciably lower than the natural frequency:

$$\frac{\Omega}{2\pi} = \frac{1}{2\pi\sqrt{L_0 C_0}} \quad (6)$$

Under these conditions, without resolving the differential Equation (1) we can conceive that, by means of a suitable choice of the various quantities, the apparent resistance $\rho$ can be periodically negative during a certain time $\theta$. If, then, the circuit under consideration is subject, by any process at all, to a periodic electromotive force of frequency $$\frac{\Omega}{2\pi} \quad (7)$$

a current will tend to flow in the said circuit, and this current will keep on growing indefinitely during the entire time $\theta$, the apparent damping of the said circuit being then negative. In this way an extremely high amplifying effect is attainable.

In order to realize periodic variations of L and C so that the product LC becomes constant, one could particularly employ a variometer of any desired type mechanically coupled with a variable condenser of the Koepsel pattern or a similar type. By giving the plates of the said condenser convenient forms it will always be possible to obtain the desired result.

In the accompanying drawings which merely illustrate diagramatically the nature of the invention, Fig. 1 is a circuit diagram showing the input of the current to be amplified, and the output of amplified current.

Fig. 2 is similar to Fig. 1, showing more clearly the mechanical connection between condenser and variometer.

Fig. 3 is a cross-sectional view of an alternator that may be used.

Fig. 4 is a side view thereof.

The present invention may be carried into practice by means of an arrangement such as illustrated in Figure 2. The self inductance varying periodically according to a definite law is formed by a variometer having the movable coil 1 and the fixed coil 2. The coil 1 is mounted on a rotatable shaft 3, upon which is also secured the movable plate 4 of a variable condenser of the Koepsel type, 5 being the startor part thereof. The capacity between 4 and 5 varies therefore periodically in conformity with a certain law during the rotation of shaft 3, said law being governed by the cross section of the plates 4 and 5. It is quite evident that such an assembly can be built in such a way that the product LC remains constant. The device actuated by the amplified current is shown diagrammatically at 7, and which may be of any desired type provided it is responsive to high frequency currents.

Along this line, a very great number of modifications are moreover possible, and the realization or performance of the basic idea as hereinbefore set forth has merely been cited by way of example. If the current to be amplified is a high frequency current $$\frac{\Omega}{2\pi} \quad \text{(8)}$$

modulated in conformity with any desired law, one could advantageously adopt for the frequency $$\frac{\omega}{2\pi} \quad \text{(9)}$$

a value above the limits of audibility. In a case of this nature the variometer could possibly be constituted by an iron-core inductance-coil of the kind described in French Letters Patent No. 502604 covering a high frequency alternator of the homopolar type and possessing a variable reluctance. Such an alternator is illustrated in Figure 3, which is a longitudinal cross-section thereof, and is shown as comprising a central coil B situated in a circular slot, the flux of which is closed through the stator S and the rotor R'. The stator and the rotor are laminated radially and longitudinally and comprise packets of sheets separated by gaps or portions which may be either empty or filled by non-magnetic material in such a manner that said stator and rotor comprise magnetic teeth as shown in Figure 4.

When the magnetic teeth of the rotor are opposite those of the stator, the circuit of the coil has its maximum self-inductance; but when the teeth of the rotor are located opposite the empty gaps or portions of the stator, the self inductance of the circuit of the coil has its minimum value.

It must be well understood that it is not absolutely indispensable in order to obtain the end aimed at by this invention to satisfy condition (2), in fact, it is feasible to depart therefrom, if desired, to an arbitrary extent without falling outside the scope of the invention.

While I have disclosed a preferred embodiment of my invention, I do not limit myself to the same; but may employ such other modifications as come within the spirit and scope of my invention.

Having described my invention what I claim is:

1. The method of amplifying alternating current by the use of an oscillating circuit having an inductance L and a capacitance C, which consists in periodically and simultaneoulsy varying the inductance L and capacitance C at a high frequency that is lower than that of the current to be amplified.

2. The method of amplifying alternating current by the use of an oscillating circuit having therein a variometer and a condenser, consisting in periodically and simultaneously varying the inductance of the variometer and the capacitance of the condenser at a superaudible frequency that is lower than that of the current to be amplified.

3. The method of amplifying alternating current of a certain frequency by the use of an oscillating circuit having therein an inductance L and a capacitance C, consisting in impressing the current to be amplified on the oscillation circuit and continuously and simultaneously varying the inductance L and capacitance C at a frequency that is lower than that of the current to be amplified.

4. An arrangement for amplifying alternating current of a certain frequency comprising an oscillation circuit having an inductance and a capacitance mechanically and electrically connected, and means for continuously varying the inductance and the capacitance simultaneously in a predetermined manner and at a high frequency that is lower than that of the current to be amplified.

5. An amplifying arrangement for high frequency currents comprising an inductance and a capacitance electrically connected, and a mechanical coupling therebetween for continuously and simultaneously varying said inductance and capacitance in a predetermined manner at a super-audible frequency lower than that of the current to be amplified.

6. An amplifying circuit arrangement for high frequency currents comprising a variometer and a variable condenser electrically connected, a mechanical coupling between the movable coil of the variometer and the movable condenser plates, and means for continuously rotating said movable members whereby the inductance and the capacity are varied periodically and simultaneously in a predetermined manner at a frequency lower than that of the current to be amplified.

7. A method of amplifying radio frequency currents which consists in impressing said currents on a circuit including inductance and capacity, and simultaneously varying the inductance and capacity at a high frequency.

8. A method of amplifying radio frequency currents which consists in impressing said currents on a circuit including inductance and capacity, and simultaneously varying the inductance and capacity at a high frequency while maintaining the product thereof constant.

9. The method of amplifying super-audible signal energy which consists in collecting signal energy, impressing the energy upon a circuit including a reactance, resonating said circuit to the frequency of said signal and varying the reactance at such a frequency with respect to said signal frequency that the resistance of said circuit becomes negative whereby a high amplification of said signal energy is secured.

10. A method of amplification which consists in collecting radio frequency signal energy, impressing the energy upon a circuit including a reactance, resonating said circuit to the frequency of said signal and simultaneously varying the reactance at a super-audible frequency whereby the resistance of said circuit becomes negative and a high amplification of the signal energy is secured.

JOSEPH BETHENOD.